United States Patent [19]
Conrad et al.

[11] Patent Number: 5,547,338
[45] Date of Patent: Aug. 20, 1996

[54] FRICTION PUMP WITH MAGNETIC BEARINGS DISPOSED IN THE IMPELLER

[75] Inventors: Armin Conrad, Herborn, Germany; Torbjörn Lembke, Upsala, Sweden

[73] Assignee: Balzers-Pfeiffer GmbH, Asslar, Germany

[21] Appl. No.: 410,444

[22] Filed: Mar. 24, 1995

[30] Foreign Application Priority Data

Mar. 26, 1994 [DE] Germany .......................... 44 10 656.4

[51] Int. Cl.⁶ .............................. F04D 19/04; F04D 29/04; F04D 29/26
[52] U.S. Cl. ..................... 415/90; 417/423.4; 417/423.12
[58] Field of Search ........................... 415/90; 417/423.4, 417/423.12

[56] References Cited

U.S. PATENT DOCUMENTS

| | | | |
|---|---|---|---|
| 4,023,920 | 5/1977 | Bächler et al. | 415/90 |
| 4,036,565 | 7/1977 | Becker | 415/90 |
| 4,541,772 | 9/1985 | Becker | 415/90 |
| 4,642,036 | 2/1987 | Young | 415/90 |
| 5,470,208 | 11/1995 | Kletschka | 417/423.12 |

Primary Examiner—Edward K. Look
Assistant Examiner—Michael S. Lee
Attorney, Agent, or Firm—Anderson Kill Olick Oshinsky, P.C.

[57] ABSTRACT

A friction pump having individual components designed to form simultaneously essential parts of a magnetic bearing assembly for supporting the pump rotor, and essential parts adapted to fulfill essential functions of a friction pump.

5 Claims, 6 Drawing Sheets

FRICTION PUMP WITH MAGNETIC BEARINGS DISPOSED IN THE IMPELLER

BACKGROUND OF THE INVENTION:

The invention relates to a friction pump for conveying gases which is designed in accordance with Siegbahn principles (further Siegbahn pump), and has at least one stage formed by a disc rotatable between two stationary discs, with the sides of the stationary discs facing the rotatable disc being provided with spirally shaped grooves and with webs.

A set of magnetic bearings forms an integral component of the pump. Herein the components characteristic of the magnetic bearings are the same as those which are significant for the functioning of a vacuum pump.

Friction pumps for conveying gases of the most varied types of construction are known. Their mode of operation is based on the transmission of impulses of moving walls to the gas particles. In this way, a gas flow in the desired direction is produced. Friction pumps which operate in a pressure range where the free travel lengths of the gas molecules is large compared to the geometrical dimensions of the pump, i.e., in the molecular flow region, are called molecular pumps.

The first friction pump of this type was described in an article by W. Gaede in "Ann. Physics 41(1913), 337p. A modification of the pump of Gaede, without deviating from the basic principle, is disclosed in an article by Siegbahn, Mathematical Archives, Ash. FIGS. 30B (1943).

In Siegbahn pumps, a rotating disc is used here as the moving wall. Another variant of a friction pump is disclosed in an article by F. Holweck, Compte Rendue Academy of Science 177 (1923) 43p. Here a cylinder surface is used as a moving wall.

A further modification of gas friction pumps is disclosed in an article of W. Becker, Vacuum Technology, 9/10 (1966). In this case, moving and stationary walls are alternately disposed one after another, wherein both wall consist of turbine-shaped discs provided with vanes. For this reason, the name turbomolecular pump was introduced for this type of pump.

These modifications of the friction pump first introduced by Gaede are evermore important in vacuum technology, in particular, in high—and ultra high vacuum technology. The utilization regions of the turbomolecular pump based on Becker principles, on the one hand, and the friction pump based on Siegbahn principles and that on Holweck principles on the other hand, are different. The turbomolecular pump is able to provide a high pressure ratio due to its construction consisting of a plurality of stages arranged in a row and is thus particularly suitable for use in the high and ultra high vacuum area. Its utilization is however, limited in the direction of higher pressures, since it is only fully efficient at low pressures approximately less than $10^{-1}$ mbar because of the large spacings of the pump parts. The friction pumps according to Siegbahn and those according to Holweck are eminently suitable for being used in the adjacent pressure range towards the high side. They can be either used separately in this pressure range, as well as also arranged in series with a turbomolecular pump. This last combination of a turbomolecular pump and a molecular pump represents an elegant possibility of moving the working range of a turbomolecular pump in the direction of higher output pressures.

It is essential for the functioning of this type of pump, that the spacing between rotating and stationary components be very small in order to keep flowback and retro-circulation losses as small as possible. This applies especially to friction pumps according to Siegbahn and Holweck. To this it must be added, that these pumps (as well as the turbomolecular pumps) only operate in the higher pressure region in the molecular flow range, if the spacings between the rotating and stationary components fulfill the condition that they be small compared to the average free travel length of the molecules of the gas to be pumped, because these pumps develop their entire pressure ratio only in the molecular flow region.

A common feature of these pumps consists in that the pressure ratio depends exponentially and the suction capacity linearly upon the circumferential velocity of the rotating parts which serve as moving walls. Therefore, it is essential for an efficient pumping behavior to raise the rotor rpm to an extent still compatible with a dependable and continuous operation.

Herein the rotor bearing system is particularly important. Apart from the classical mechanical rotor bearings, i.e. lubricated ball bearings, a combination of permanent magnet bearings and ball bearings is used today. Actively controlled magnetic bearings of the most varied embodiments are used for completely contactless bearing support.

The two extreme requirements, high rpm and minimum spacings between stationary and rotating parts, are two conditions for the design of a friction pump which can be combined with each other only with great difficulty. The higher the rpm the larger must be the minimum spacing between stationary and rotating parts in order to prevent butting wear and thus damage or even complete destruction of the pump. In the friction pumps of Siegbahn and Holweck, where the gaps for achieving an effective and an efficient pump behavior must be extremely narrow, these criteria are of utmost significance. In particular, the preservation of the predetermined gaps over a long period of time during continuous operation is fraught with great difficulties.

The object of the invention is a friction pump which assures a secure and dependable continuous operation at the extreme requirements, such as high rpm and minimum gaps, while preserving the outstanding properties in vacuum technology, such as for instance a vacuum devoid of oil, which is characteristic of such pumps. Another object of the invention is a friction pump in which extremely tight gaps are maintained over the time span of a continuous operation of friction pumps of Siegbahn and Holweck.

SUMMARY OF THE INVENTION

These and other objects of the invention, which will become apparent hereinafter are achieved by forming the rotating disc of an electrically conductive material, with permanent magnets located in opposite sides of the rotatable disc and supported on the stationary discs. The magnets induce oppositely directed eddy currents in the rotatable disc. The eddy current produce a magnetic field which exerts a stabilizing force acting on the rotatable part in the axial direction.

The difficulties involved in keeping the very tight gaps intact in friction pumps is solved in an elegant way by the development of a novel magnetic bearing. The solution is simple and elegant since the basic components of the pump and the magnetic bearings are identical, meaning the components fulfill simultaneously the differing requirements of generating the pumping effect of a friction pump, while at the same time exhibiting the properties of a magnetic bearing.

The magnetic bearing is a self regulating bearing and is based on the principle of eddy current induction. Herein, the regulating portion consists basically of an electrically conducting thin wall component, opposite of which an array of permanent magnets is located. If now the electrically conducting thin wall component moves relatively to the permanent magnet, eddy currents are induced in the thin wall in such a way that repelling forces between the electrically conductive component and the magnet are generated by the magnetic field resulting therefrom. If the electrically conducting component and the magnets approach each other, the magnitude of the induced currents increases and thus also the strength of the magnetic field resulting therefrom. Thereby, the repelling forces which act counter to the component motion will also increase. A corresponding effect occurs if the distance between the electrically conducting component and the permanent magnets increases. The electrically conducting component thus represents a magnet subject to a variable magnetization. The mechanism of self regulation is produced in this way.

There exist various possibilities of geometrically arranging the parts movable relative to each other. Apart from the case of a linear arrangement, wherefrom a magnetic linear bearing would be formed, which has no interest for our application cases, there are two possibilities of rotationally symmetrical arrangements suitable for use in vacuum pumps.

The electrically conducting component can be configured as a rotating disc. A stator arrangement is present on both sides of this disc, which stator arrangement is equipped with permanent magnets. This corresponds basically to the construction of a friction pump of Siegbahn. Here also rotating disc is located between the stator arrangement.

In the invention, the individual components of the magnetic bearing and the friction pump of Siegbahn are designed and assembled in such a way, that they fulfill simultaneously the properties of a magnetic bearing and those of a friction pump. This means that the rotating thin wall disc must have a good electric conductivity, so that induction currents can be form. The material must in addition be of such strength, that it can carry the loads caused by the high rpm's necessary in a friction pump. The stator components must receive the permanent magnets and simultaneously be provided with spirally shaped grooves for conveying the gas. In a deviation from this type of construction, the grooves can also be formed in the rotor disc.

The electrically conducting component can also be configured as a rotating hollow cylinder. A stator arrangement is located on both sides of the hollow cylinder which stator arrangement is complemented by permanent magnets. This corresponds basically to the structure of a friction pump of Holweck. Here also a rotating cylinder is located between the stator complement.

If the same thoughts as those described above in connection with the example of a friction pump of Siegbahn, are used, an elegant and simple design of a magnetically supported friction pump of Holweck is created. Here, the spirally shaped grooves can also be formed in the stator parts as well as in the rotor.

Between these two types of construction, namely the rotating disc and the rotating cylinder, the electrically conducting component can assume any cone-shape or spherical-shape. An appropriate design of the remaining components results from the considerations enumerated above.

Both types of construction can be simultaneously used, as far as their function as bearing elements or as pump elements, in combination to form a pump. In that case an additional radial (for Siegbahn design) or axial support (for the Holweck design) need not be used. Minimum spacings between rotating and stationary components and as high circumferential velocities as possible are premises, which must be met for the efficient operation of a magnetic bearing as well as of the friction pump.

The invention provides a design satisfying the extreme requirements. Thus, a magnetically supported vacuum pump can be built where the essential parts of the magnetic bearing also fulfill simultaneously the essential functions of a vacuum pump. Such an elegant and simple design permits the more compact construction space-wise which is also more dependable and secure than conventional designs. In structural combination with Turbomolecular pumps, vacuum pumps are provided which can be used within a wide pressure range, and which can be operated with simple forepumps (for instance, diaphragm pumps).

BRIEF DESCRIPTION OF THE DRAWINGS

The invention will be now described in detail with reference to the drawings, wherein.

DETAILED DESCRIPTION OF THE PREFERRED EMBODIMENTS

Figure 1:
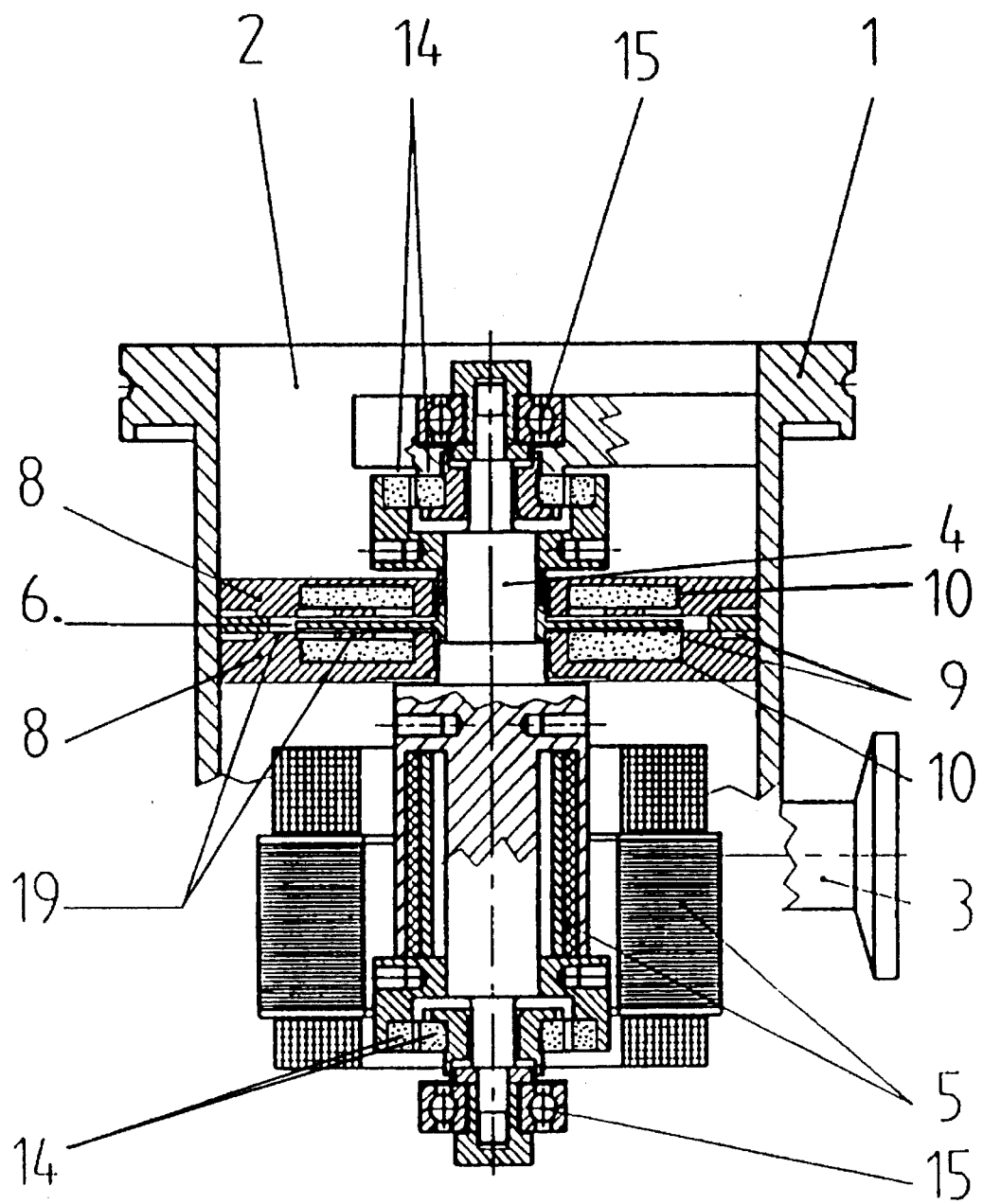
FIG. 1 shows a cross-sectional view of a Siegbahn friction pump which simultaneously serves as a magnetic axial bearing.
Figure 2:
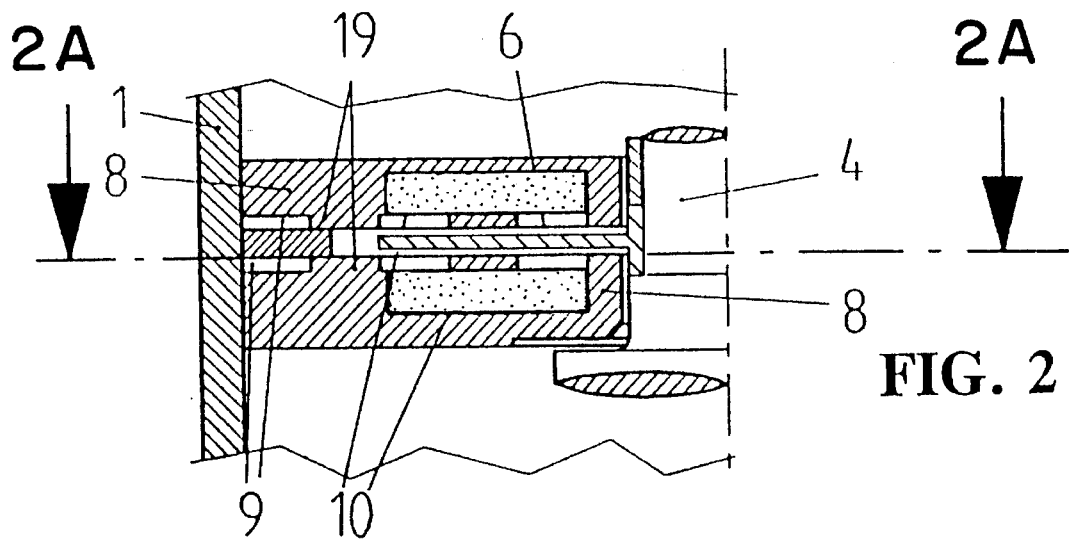
FIG. 2 shows a portion of the pump from FIG. 1 at an enlarged scale.
Figure 2A:
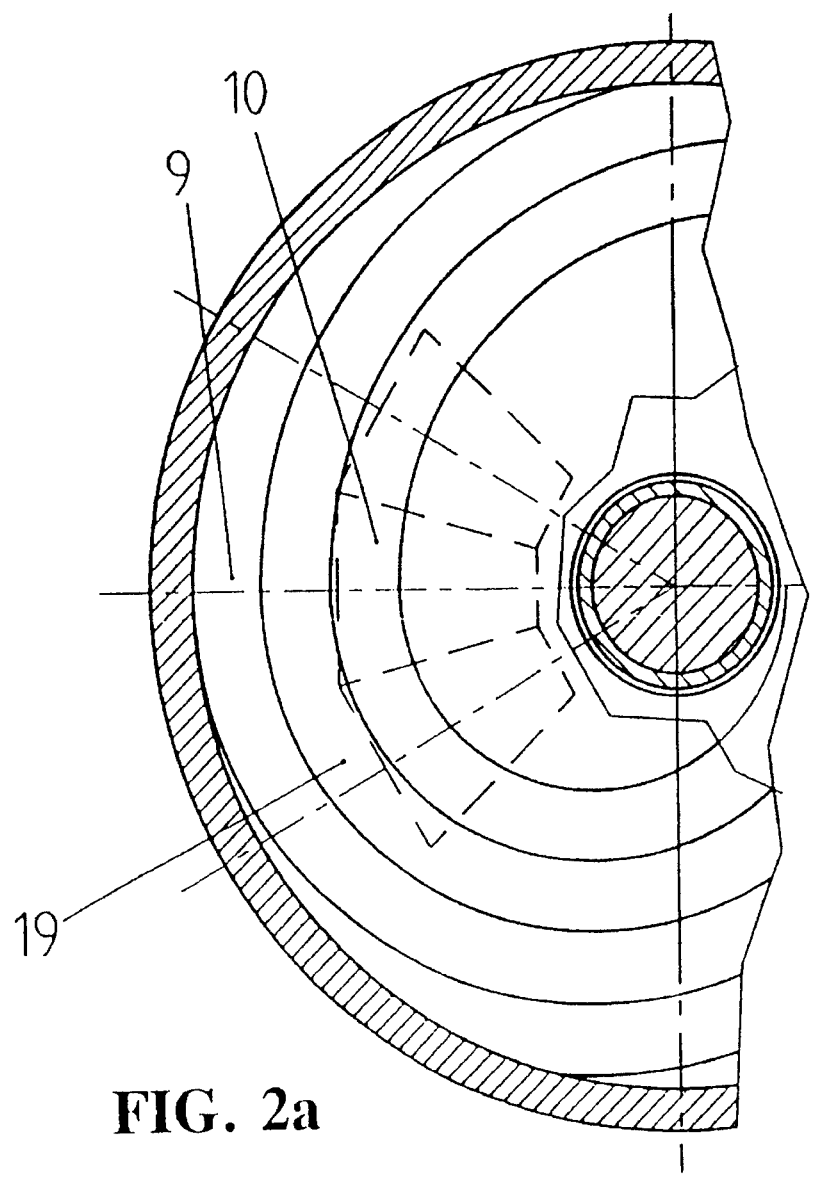
FIG. 2a shows a cross-sectional view along line A—A' in FIG. 2.

A single-stage Siegbahn friction pump according to the present invention is shown in FIGS. 1 and 2. The pump components serve simultaneously as basic construction elements of a self regulating magnetic axial set of bearings. The pump includes a shaft 4 which is driven by a motor arrangement 5 located in the pump housing 1. The housing 1 is provided with suction flange 2 and the gas outlet aperture 3. A flat disc 6 made from an electrically conducting material is fastened upon the shaft 4. Stator discs 8 are located on both opposite sides of the flat disc 6. These stator discs 8 serve as pump elements. The discs 8 are provided with spirally shaped grooves 9 separated by webs 19. The gas which is displaceable by the rotating disc 6 is conveyed in the grooves. The stator discs 8 are complemented by permanent magnets 10 in their function as elements of the magnetic axial bearing, which permanent magnets are fastened below the grooves 9 or in the webs 19. The permanent magnets 10 induce currents in the rotating electrically conducting disc 6 which currents produce a magnetic field. The magnetic field forces cause an axial repulsion between the rotating disc 6 and the stator discs 8. If the rotating disc 6 approaches one of the stator discs 8, the magnetic field is strengthened on this side and the repelling forces increase. Correspondingly, the repelling forces diminish if the spacing between the rotating disc 6 and the stator discs 8 is increased. Thus, self regulation of the magnetic axial bearing results.

The rotor arrangement in the discussed embodiment is stabilized in the radial direction by a passive permanent magnetic bearing 14. The radial stabilization can however, also be achieved by any desired other magnetic, electromagnetic and/or mechanical arrangement.

Since the induced current and the resulting magnetic field are generated only when the disc 6 rotates, the bearing has no effect whatsoever if the arrangement is stationary or does not operate. Start-up bearings 15 are provided for that case, which axially assists the rotor arrangement when it is stationary and at the start of rotation. These bearings 15 serve at the same time as emergency bearings for the overall arrangement during operation.

Figure 3:
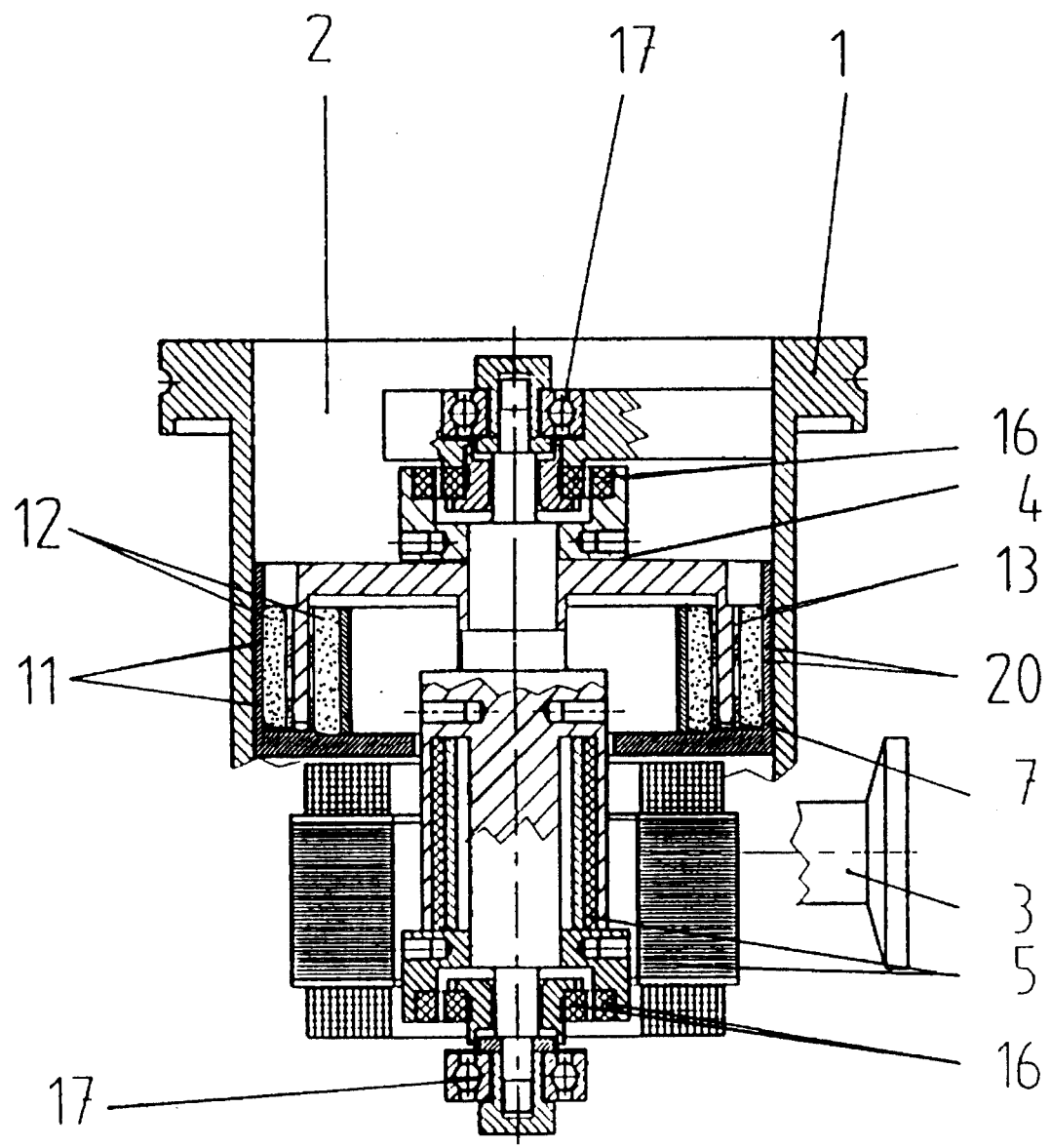
FIG. 3 shows a cross-sectional view of a Holweck, friction pump, which serves simultaneously as a magnetic radial bearing.
Figure 4:
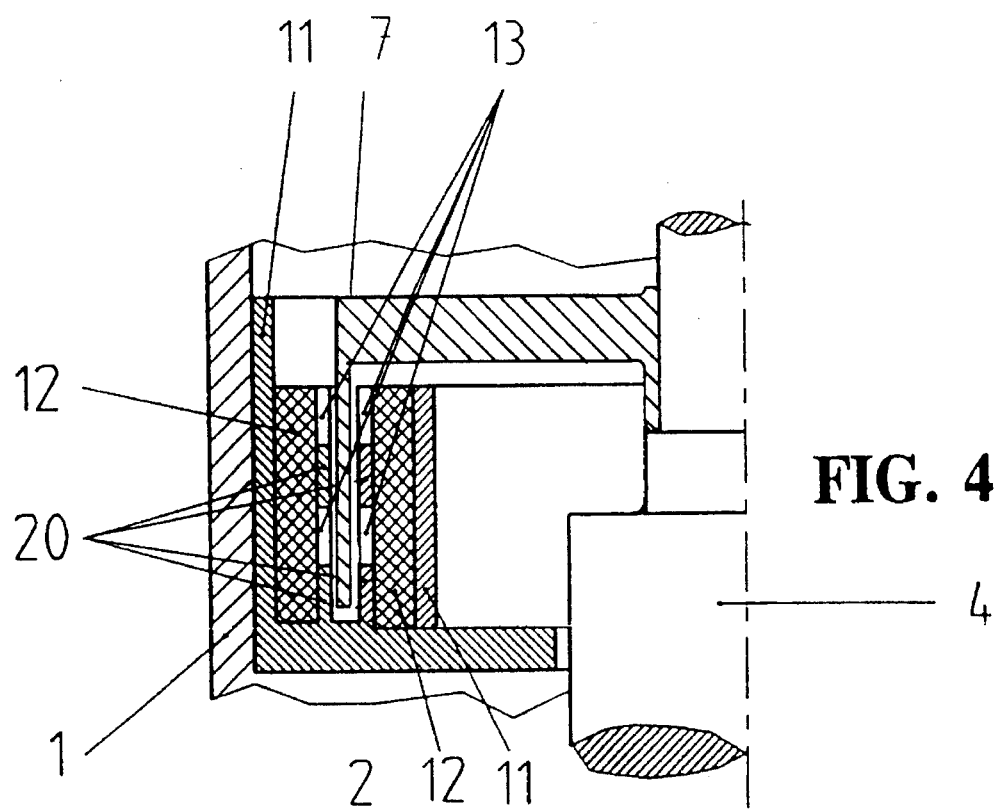
FIG. 4 shows a portion of the pump from FIGS. 3 at an enlarged scale.
Figure 5:
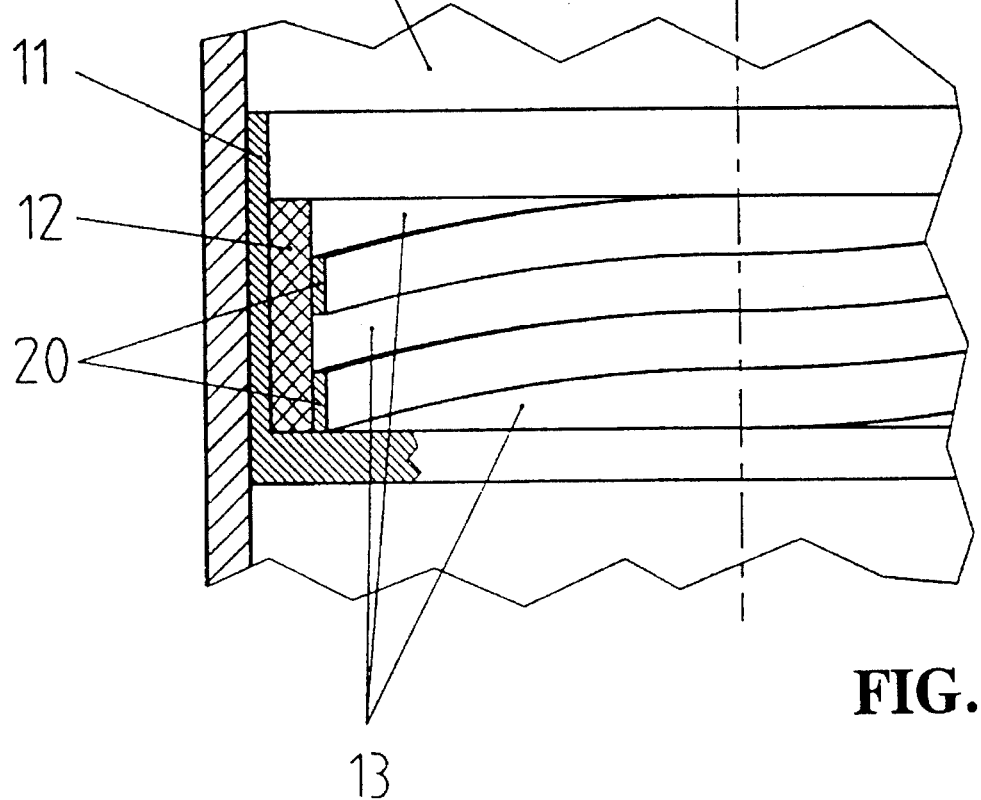
FIG. 5 shows a partial front view of the external stationary cylinder wall of the pump shown in FIGS. 3 and 4.

FIGS. 3, 4 and 5 shows a Holweck single stage friction pump whose components serve simultaneously as basic building elements for a magnetic radial bearing support with self regulation. The pump housing, the shaft and the motor arrangement correspond to those of the Siegbahn pump shown in FIG. 1, and are designated with the same reference numerals. Instead of the flat disc, a hollow cylinder 7 made from an electrically conductive material is fastened on the shaft 4. Stationary cylinder walls 11 are located on both opposite sides of the hollow cylinder 7. The walls are provided with spirally shaped grooves 13 and webs 20 for their function as pump elements. The gas is conveyed in them after it has been displaced by the rotating hollow cylinder 7. The fixed cylinder walls 11 are provided with permanent magnets 12 for their function as elements of the axial magnetic bearing, with the permanent magnets 12 being fastened below the groove 13 or in the webs 20. Upon rotation of the hollow cylinder 7 the same effect of repulsion and self-regulation occurs as it was described with reference to the first embodiment. The difference consists in that the forces now act in the radial direction. The rotor arrangement is stabilized in axial direction by a passive permanent magnet bearing 16 or by a bearing arrangement having the same effect. The ball bearings 17 are provided in this embodiment, as start-up and emergency bearings. It is, however, possible to provide spirally-shaped grooves and webs also on the stationary discs or on the stationary cylinder walls, without changing the basic mode of operation.

The invention was shown and described with reference to single stage friction pumps shown in FIGS. 1 to 5. Higher pressure ratios are achieved by disposing several pump stages axially or consecutively in radial direction.

Figure 6:
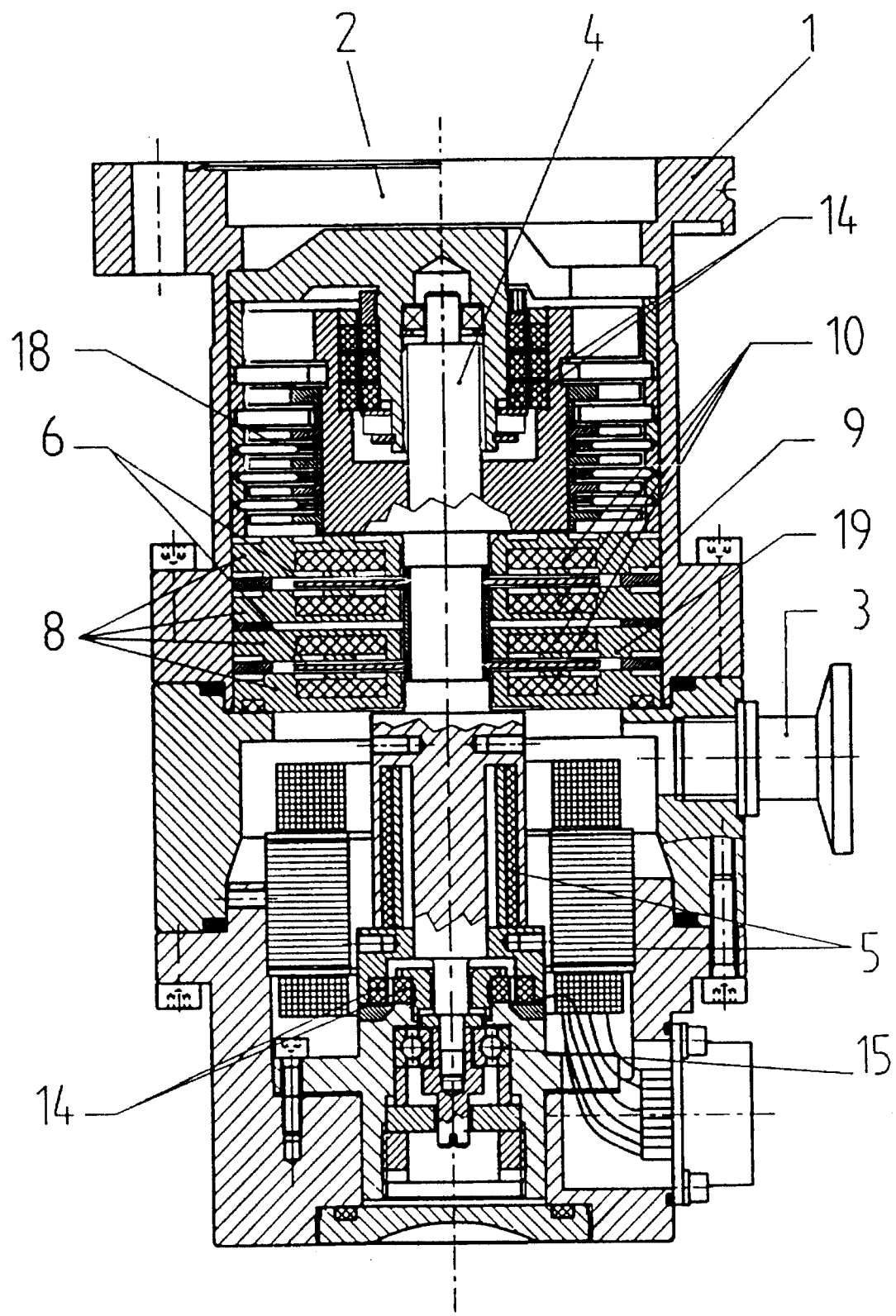
FIG. 6 shows a cross-sectional view of a combination of a friction pump of Siegbahn with a turbomolecular pump.

FIG. 6 shows a Siegbahn multi-stage friction pump in combination with a turbomolecular pump 18.

Figure 7:
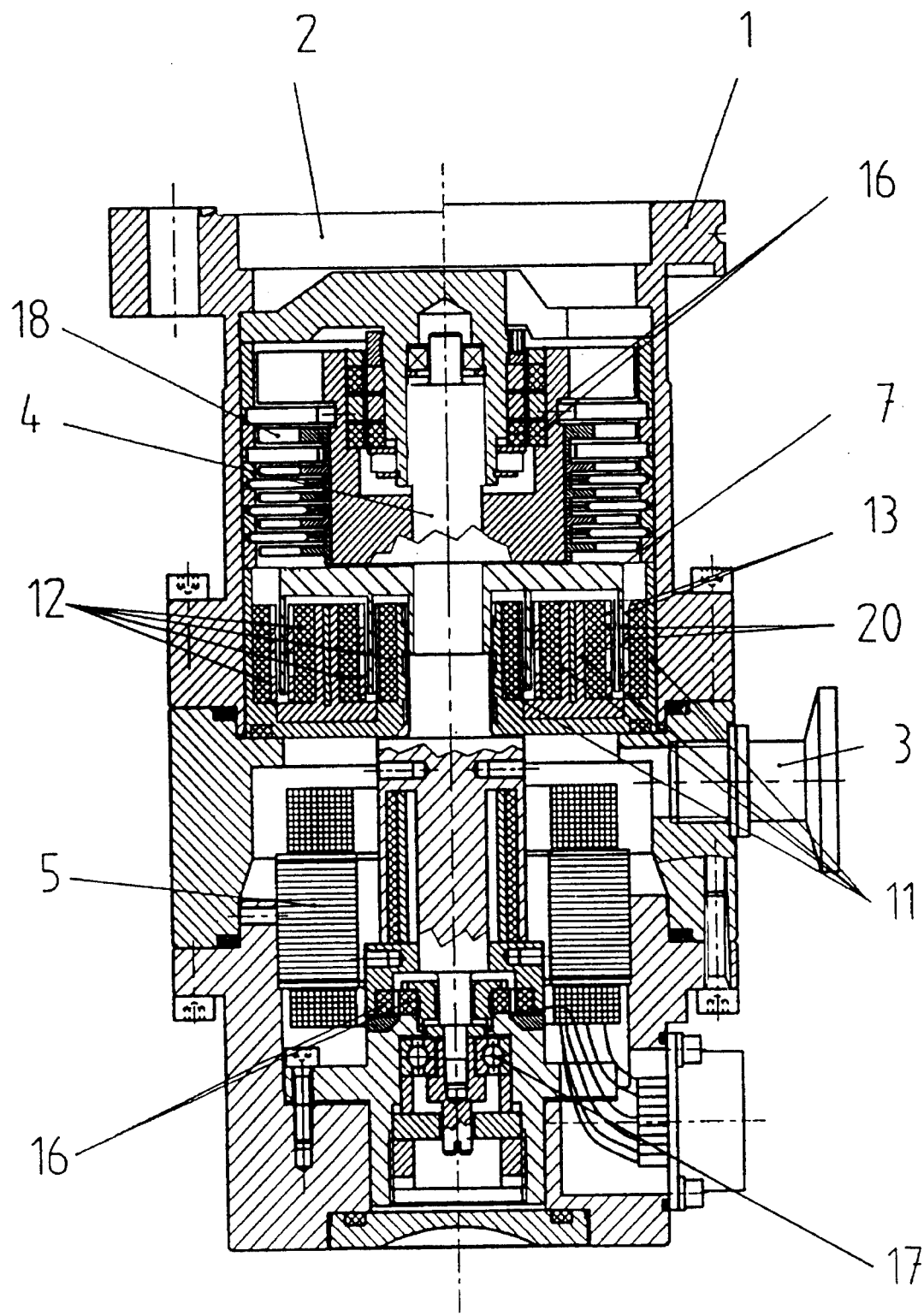
FIG. 7 shows a cross-sectional view of a combination of a friction pump of Holweck with a turbomolecular pump.

FIG. 7 shows a similar arrangement with a Holweck multi-stage friction pump.

Though the present invention was shown and described with reference to the preferred embodiments, various modification thereof will be apparent to those skilled in the art and, therefore, it is not intended that the invention be limited to the disclosed embodiments and details thereof, and departure may be made therefrom within the spirit and scope of the present invention as defined in the appended claims.

What is claimed is:

1. A friction pump for conveying gases, comprising at least one pump stage, said at least one pump stage, including:

a rotor;

two spaced stationary discs having on surfaces thereof facing each other spirally-shaped grooves and webs;

a rotating disc formed of an electrically conductive material, located between said two stationary discs, and mounted on the rotor for joint rotation therewith; and a plurality of permanent magnets mounted on said surfaces of said two stationary discs facing each other;

wherein said permanent magnets are mounted in such a manner that they induce, in said rotating disc, oppositely directed eddy currents which produce a magnetic field generating a force for stabilizing said rotor in an axial direction.

2. A friction pump according to claim 1, wherein said permanent magnets are mounted below said spirally-shaped grooves and webs.

3. A friction pump according to claim 2, wherein said permanent magnets are located within respective webs.

4. A friction pump according to claim 1, further comprising additional permanent magnets for stabilizing said rotor in a radial direction.

5. A friction pump according to claim 1, further comprising at least one mechanical bearing for stabilizing said rotor in the axial direction before actuation of the pump and shortly after the pump actuation.

* * * * *